United States Patent
Faber et al.

(10) Patent No.: US 9,515,464 B2
(45) Date of Patent: Dec. 6, 2016

(54) BUS END ARC INTERRUPTER

(71) Applicant: SCHNEIDER ELECTRIC USA, INC., Palatine, IL (US)

(72) Inventors: Timothy Faber, Marion, IA (US); Cameron Woodson, Cedar Rapids, IA (US); Marc Rival, Saint Ismier (FR); Jean-Paul Gonnet, Fontaine (FR)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 63 days.

(21) Appl. No.: 14/585,477

(22) Filed: Dec. 30, 2014

(65) Prior Publication Data
US 2016/0190780 A1    Jun. 30, 2016

(51) Int. Cl.

| | |
|---|---|
| *H02B 13/025* | (2006.01) |
| *H01T 4/02* | (2006.01) |
| *H01T 4/04* | (2006.01) |
| *H02B 1/20* | (2006.01) |
| *H02B 1/56* | (2006.01) |
| *H01H 9/34* | (2006.01) |
| *H01T 4/14* | (2006.01) |
| *H01H 85/44* | (2006.01) |

(52) U.S. Cl.
CPC ............ *H02B 13/025* (2013.01); *H01H 9/342* (2013.01); *H01T 4/02* (2013.01); *H01T 4/04* (2013.01); *H01T 4/14* (2013.01); *H02B 1/20* (2013.01); *H02B 1/56* (2013.01); *H01H 85/44* (2013.01)

(58) Field of Classification Search
CPC ........... H02B 13/025; H02B 1/20; H02B 1/56; H01T 4/02; H01T 4/04; H01T 4/14; H01H 9/342; H01H 85/44

USPC .................................................. 361/600–678
See application file for complete search history.

(56) References Cited

U.S. PATENT DOCUMENTS

| | | |
|---|---|---|
| 3,162,741 A | 12/1964 | Lindgren |
| 4,620,126 A | 10/1986 | Manske |
| 6,205,019 B1 | 3/2001 | Krom |

(Continued)

FOREIGN PATENT DOCUMENTS

| | | |
|---|---|---|
| FR | 2275911 A1 | 1/1976 |
| WO | 2006074721 A1 | 7/2006 |
| WO | 2015009291 | 1/2015 |

OTHER PUBLICATIONS

Nelson, John P., et al. "The Effects of System Grounding, Bus Insulation, and Probability On Arc Flash Hazard seduction—Part 2: Testing." Industry Applications, IEEE Transactions on 51.3 (2015): 2665-2675.

(Continued)

*Primary Examiner* — Zachary M Pape
(74) *Attorney, Agent, or Firm* — Locke Lord LLP

(57) ABSTRACT

Method and system for controlling and limiting the damage caused by arcs formed on exposed conductors in electrical distribution equipment involve using the tendency of an arc to move in a direction away from a current source and toward the terminal ends of the conductors. An arc interruption device, or arc interrupter, is placed over the terminal ends of the conductor to capture the arc as it travels toward the terminal ends of the conductors. Within the arc interrupter, the shape of the arc is conformed to geometries designed to stretch and extend the arc to the point where it can no longer be sustained and is extinguished.

18 Claims, 11 Drawing Sheets

(56) References Cited

U.S. PATENT DOCUMENTS

| | | |
|---|---|---|
| 8,922,977 B2 | 12/2014 | Faber |
| 9,338,866 B1* | 5/2016 | Faber .................... H05F 3/04 |
| 2015/0015997 A1* | 1/2015 | Faber .................... H02B 11/04 361/2 |
| 2015/0255963 A1* | 9/2015 | Andreoletti .............. H02B 1/20 361/624 |
| 2015/0372461 A1* | 12/2015 | Romero Legorreta .............. H01B 17/42 361/612 |

OTHER PUBLICATIONS

EP Extended Search Report for EP Application 15203161.3 dated May 24, 2016.

\* cited by examiner

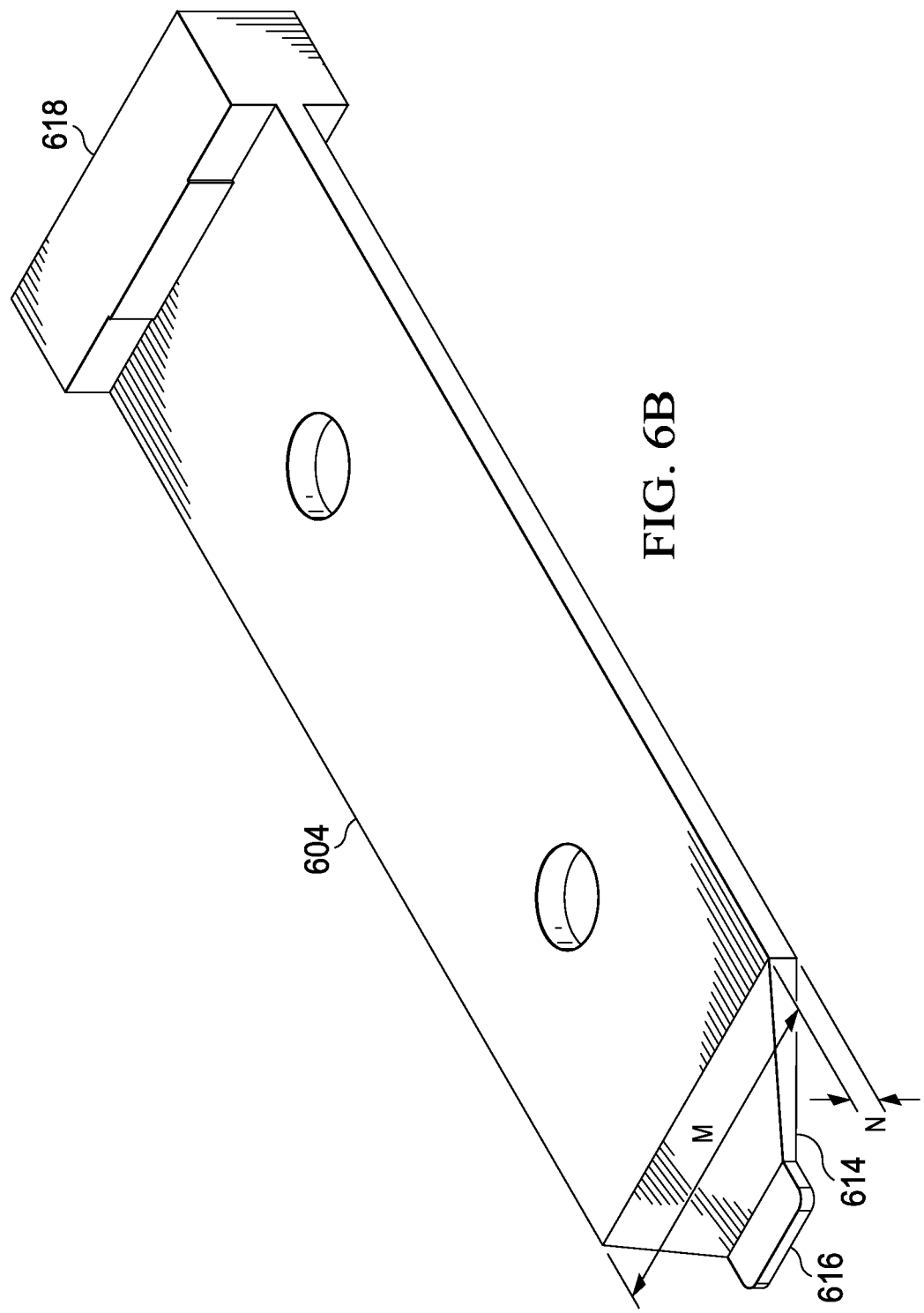

BUS END ARC INTERRUPTER

CROSS-REFERENCE TO RELATED APPLICATIONS

The present application is related in subject matter to commonly-assigned U.S. application Ser. No. 13/452,145, entitled "Passive Arc Management System with a Flue Chamber," filed 20 Apr. 2012; International Application No. PCT/US13/50797, entitled "Internal Arc Management and Ventilation for Electrical Equipment," filed 17 Jul. 2013; U.S. application Ser. No. 14/501,946, entitled "Passive Arc Protection for Main Breaker Line Side Power Conductors," filed Sep. 30, 2014; U.S. application Ser. No. 14/585,518, entitled "Method for Treating Internal Arcs," filed concurrently herewith; and U.S. application Ser. No. 14/585,703, entitled "Panelboard Power Bus with Arc Transfer for Passive Arc Control," filed concurrently herewith, all of which are incorporated herein by reference in their entirety.

FIELD OF THE INVENTION

The present invention relates generally to methods and systems for controlling and limiting the impact of arcing in electrical distribution equipment and, more particularly, to a method and system for extinguishing arcs that occur between electrical conductors in such distribution equipment.

BACKGROUND OF THE INVENTION

Arcing or arc fault is an electrical discharge through a normally nonconductive gas, usually air. Such arcing can occur between exposed conductors of different electrical potentials, typically between adjacent busbars or between a busbar and ground in low-voltage electrical distribution equipment. When an arc jumps from one conductor to another across an air gap, it can produce extremely hot gasses, vaporized metals/polymers, and other harmful byproducts. Although the arc must remain in contact with the conductors to be viable, the shape of the arc can stretch and wrap around obstacles to follow the path of least resistance across the air gap.

The hazards of unexpected and/or uncontrolled arcing are well known and include potential damage to equipment and harm to personnel in the operating environment caused by arc flash and arc blast, hereinafter referred to for simplicity as arc blast. Techniques for controlling arcing are known in the art, including passive and active arc control techniques. Active arc control techniques usually include some form of sensing and a switching mechanism to control the arc current. Concerns with active techniques may include higher cost, nuisance breaker trips, speed, and undetected system failures. Passive techniques may include containment and directed venting of the arc blast energy and gasses out of the equipment cabinet. Other passive arc control techniques may include reinforcement of the cabinet structure in an effort to withstand the blast. Neither of the above passive methods limits the duration of the arcing event.

Thus, a need exists for an improved way to control and limit the damage caused by arcs in electrical distribution equipment and particularly arcs on exposed conductors such as between two busbars or a busbar and ground in the electrical distribution equipment.

SUMMARY OF THE DISCLOSED EMBODIMENTS

The embodiments disclosed herein are directed to methods and systems for controlling and limiting the damage caused by arcs formed on exposed conductors such as between two or more busbars or a busbar and ground in electrical distribution equipment. The methods and systems take advantage of the tendency for electromagnetic forces to push an arc in a direction away from a current source. This phenomenon compels an arc formed between two parallel conductors to travel toward the terminal ends of the conductors or the ends that are opposite the current source. An arc interruption device, or arc interrupter, may then be placed over the terminal ends of the conductor, thus forcing the arc to enter the arc interrupter as it travels toward the conductor terminal ends. Inside the arc interrupter, the shape of the arc is conformed to geometries designed to stretch and lengthen the arc, and thereby attenuate its current and temperature to the point where it can no longer be sustained and is ultimately extinguished.

In some implementations, the arc interrupter includes an enclosure having an entrance for the arc and an exhaust port that fits over the terminal ends of the conductors. The enclosure may be generally divided into two zones, an arc transit zone that encompasses the entrance of the enclosure and an arc interruption zone that encompasses the exhaust port.

The arc transit zone is designed to receive the arc and provide a shaped path for it to travel essentially unimpeded within the enclosure toward the terminal ends of the conductors. A nonconductive insulated phase barrier resembling a nonconductive busbar may be disposed within the arc transit zone for shaping the arc. The insulated phase barrier may extend along a longitudinal axis of the enclosure up to the arc interruption zone substantially equidistant between the parallel conductors. The phase barrier has a terminal end that ends substantially even with or a predefined distance beyond the terminal ends of the conductors, but a width that is smaller than the widths of the conductors by a predefined amount on each side. A substantially C-shaped channel member may be provided in the transit zone adjacent to the sides of the phase barrier and extending in a longitudinal direction along the phase barrier to define a C-shaped corridor on each side of the phase barrier. This forces any arc entering the arc interrupter to assume an arcuate or serpentine shape in the side corridors, thus stretching and increasing the voltage of the arc. The increased voltage reduces the arc current, resulting in lower total energy generated by the arc. A convergence device resembling a cone may be disposed at the entrance of the enclosure to help funnel the arc into the arc interrupter. Backflow valves may also be mounted near the entrance of the enclosure to help keep hot gasses produced by the arc from escaping backward through the entrance.

The arc interruption zone is designed to stretch and extend the arc to the point where it is no longer viable and is extinguished. This may happen primarily in two stages. In the first stage, the arc is received from the arc transit zone and is transitioned away from the C-shaped side corridors at the sides of the phase barrier toward the center of the enclosure. To this end, a conductive arc plate may be attached to the terminal end of the phase barrier extending in the same direction as the phase barrier to provide a medium for moving the arc to the center of the enclosure. In the second stage, the arc is stretched and lengthened to such a degree that it can no longer be sustained and is thus extinguished. The stretching and lengthening may be accomplished by providing a nonconductive or insulated phase barrier extension attached to the end of the conductive arc plate extending in the same direction as the phase barrier. The arc cannot penetrate or go through the phase barrier extension and must form or reform beyond the barrier extension, thus further lengthening the arc. Alternatively, instead of a conductive arc plate, a tapered section may be attached to the phase barrier to transition the arc away from the side corridor and towards the center of the enclosure. Such a tapered section may have a tapered or progressively narrower width away from the phase barrier, and may also have a tapered or progressively thinner thickness away from the phase barrier in some embodiments. An exhaust port may be formed in the enclosure in line with the barrier extension to allow expanding hot gasses produced by the arc to escape from the enclosure.

In general operation, an arc forming between the conductors is forced by electromagnetic forces into the arc transit zone of the arc interrupter through the entrance thereof. Once inside the arc interrupter, the arc is guided along the side corridor formed on either side of the phase barrier until it reaches the arc interruption zone. The C-shaped channel member adjacent to each side of the phase barrier forces any arc in the side corridors to assume an arcuate or serpentine shape, thus shaping and stretching the arc as it travels along the side corridors. The conductive arc plate in the arc interruption zone then transitions the arc from the side corridors to the center of the enclosure. Alternatively, a tapered section attached to the phase barrier may transition the arc from the side corridor to the center of the enclosure. Expanding hot gasses, aided by electromagnetic forces, thereafter push the arc toward the insulated barrier extension, forcing the arc to form or extend beyond the barrier extension. As the arc extends over the insulated barrier extension, it becomes stretched to such an extent that it can no longer be sustained and is subsequently extinguished and disperses.

In some implementations, the arc interrupter may be a single phase arc interrupter having a single insulated phase barrier disposed between two parallel conductors or a conductor and ground. In some implementations, the arc interrupter may be a multiphase arc interrupter having multiple insulated phase barriers, each insulated phase barrier disposed between two parallel conductors or a conductor and ground.

In general, in one aspect, the disclosed embodiments are directed to an arc interruption device for electrical distribution equipment. The arc interruption device comprises, among other things, an enclosure having an arc transit zone and an arc interruption zone, the arc transit zone including an entrance to the enclosure and the arc interruption zone including an exhaust port from the enclosure. The arc interruption device further comprises an insulated phase barrier disposed within the arc transit zone and extending longitudinally along the enclosure into the arc interruption zone, the enclosure having sidewalls that form a side corridor with the phase barrier on each side of the phase barrier. An arc extender is attached to the insulated phase barrier extending longitudinally along the enclosure in the arc interruption zone, the arc extender configured to transition an arc away from the side corridor and toward a center of the enclosure.

In general, in another aspect, the disclosed embodiments are directed to a busbar assembly for electrical distribution equipment. The busbar assembly comprises, among other things, a plurality of busbars spaced apart substantially parallel to one another, each busbar having a terminal end that extends away from a current source, and an arc interrupter mounted over the terminal ends of at least two of the busbars. The arc interrupter has an arc transit zone extending longitudinally along the arc interrupter and an arc interruption zone extending from the arc transit zone longitudinally along the arc interrupter. The arc transit zone is configured to receive an arc occurring between at least two of the busbars and to guide the arc toward the arc interruption zone, and the arc interruption zone is configured to extinguish the arc and to expel gases and byproducts resulting from the arc.

In general, in still another aspect, the disclosed embodiments are directed to a method of extinguishing arcs occurring between busbars. The method comprises, among other things, receiving an arc in an arc interrupter, the arc occurring between at least two busbars, each busbar spaced apart substantially parallel to one another, each busbar having a terminal end extending away from a current source, the arc interrupter mounted over the terminal ends of the busbars. The method also comprises conforming the arc to an arcuate shape within at least one side corridor of the arc interrupter, and moving the arc within the at least one side corridor toward the terminal ends of the busbars. The method further comprises centering the arc along a longitudinal axis of the arc interrupter at the terminal ends of the busbars, the centering causing the arc to change from the arcuate shape to a distended shape. The arc is then extended sufficiently far beyond the terminal ends of the busbars such that it is extinguished.

BRIEF DESCRIPTION OF THE DRAWINGS

The foregoing and other advantages of the disclosed embodiments will become apparent upon reading the following detailed description and upon reference to the drawings, wherein:

FIGS. 6A and 6B show a longitudinal cross-section of another exemplary arc interrupter and an exemplary phase barrier, respectively, according to some implementations of the disclosed embodiments;

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
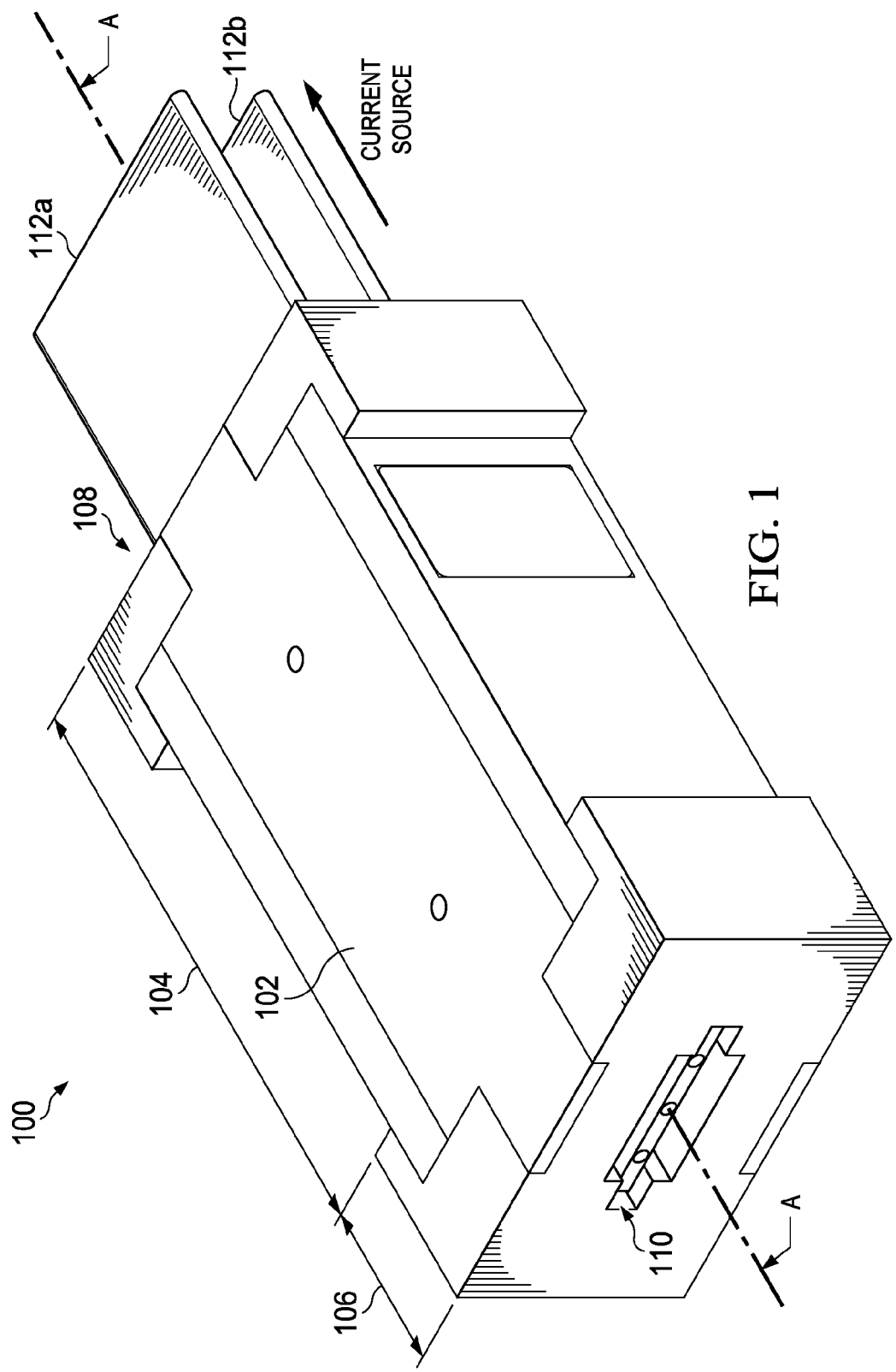
FIG. 1 is a perspective view of an exemplary arc interrupter according to some implementations of the disclosed embodiments.

Referring now to FIG. 1, an arc interrupter 100 is shown according to the disclosed embodiments for extinguishing arcs that may form between two or more busbars or a busbar and ground in electrical distribution equipment. As mentioned earlier, the arc interrupter 100 makes use of a natural tendency of an arc formed between two parallel busbars to travel away from a current source and toward the terminal ends of the busbars. The arc interrupter 100 may then be placed over the terminal ends of the busbars to capture the arc, conform the shape of the arc to geometries designed to stretch and lengthen the arc, and thereby attenuate its current and temperature to the point where it is no longer a viable arc.

As can be seen in FIG. 1, the arc interrupter 100 includes an enclosure 102 that may be generally divided into two zones, an arc transit zone 104 and an arc interruption zone 106. The arc transit zone 104 is where the arc is received in the enclosure 102 and includes an entrance 108 for allowing the arc to enter the enclosure 102, while the arc interruption zone 106 is where the arc is disrupted and includes an exhaust port 110 for evacuating arc gases and byproducts. The enclosure 102 itself is mounted or otherwise disposed on parallel busbars 112a and 112b over the terminal ends thereof, which are the ends extending away from the current source. The busbars 112a-b in turn run substantially parallel to a longitudinal axis A-A of the enclosure 102. Note that although the enclosure 102 is designed for two busbars 112a-b in the example shown here, which is typical for a single-phase/2-conductor system, the inventive concepts disclosed herein are equally applicable to other types of systems, including single-phase/3-conductor systems, 3-phase/3-conductor systems, 3-phase/4-conductor systems, and the like.

Figure 2:
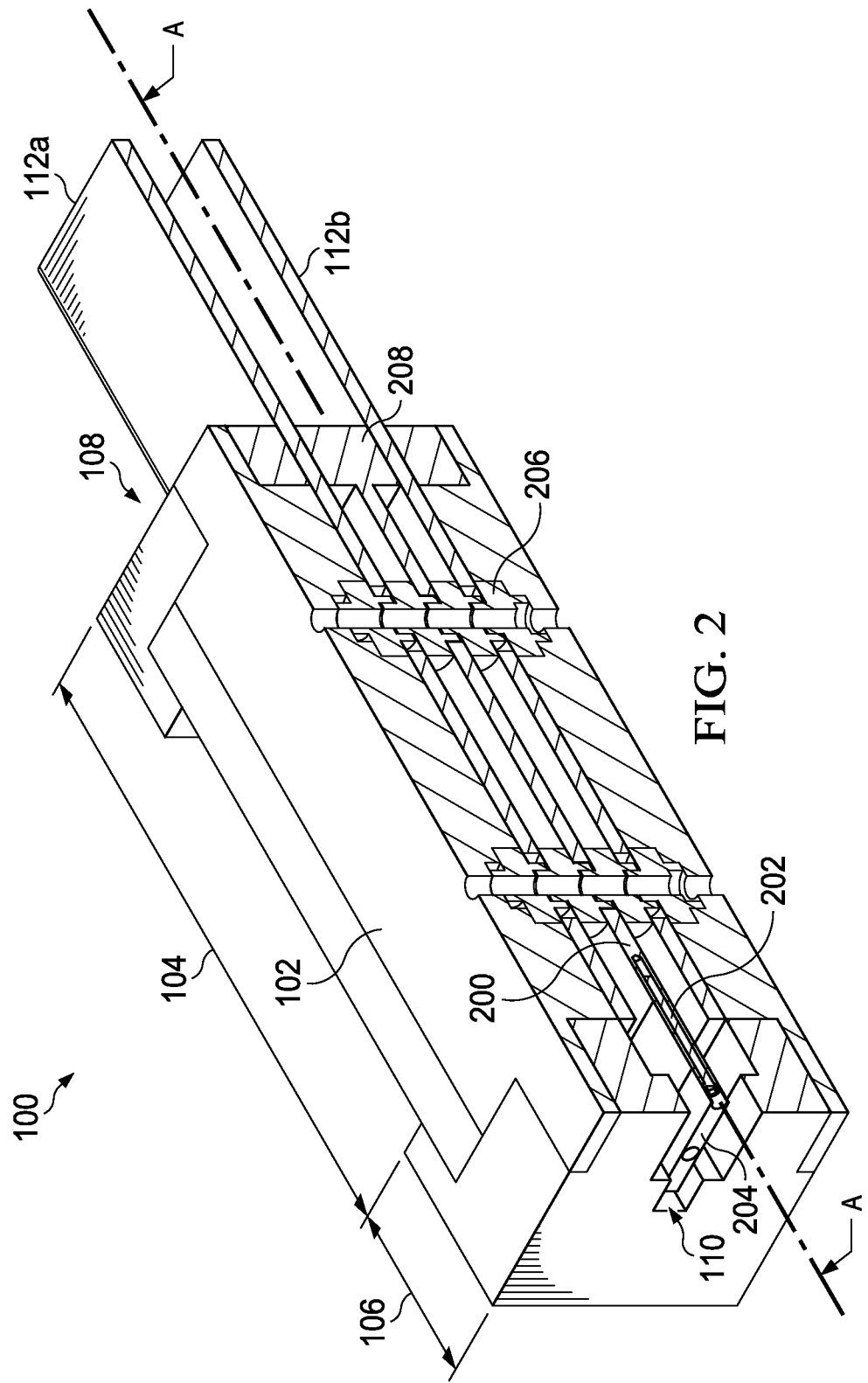
FIG. 2 is a longitudinal cross-sectional view of the arc interrupter according to some implementations of the disclosed embodiments.

FIG. 2 is a cross-sectional view of the arc interrupter 100 along the longitudinal axis A-A showing the enclosure 102 mounted over the terminal ends of the busbars 112a-b. From this view, a phase barrier 200 may be seen extending in a longitudinal direction between the busbars 112a-b substantially parallel therewith. In some embodiments, the phase barrier 200 may resemble a nonconductive or insulated busbar 112a-b disposed substantially equidistant between the parallel busbars 112a-b. The phase barrier 200 starts from near the entrance 108 of the enclosure 102, runs through the transit zone 104, and ends near the terminal ends of the busbars 112a-b. At that end, a conductive arc plate 202 may be attached to the phase barrier 200 along the longitudinal axis A-A, and a nonconductive barrier extension 204 may be attached to the conductive arc plate 202 along the longitudinal axis A-A.

Several annular busbar supports 206 may be provided, one each between the phase barrier 200 and each busbar 112a-b as well as between each busbar 112a-b and the enclosure 102. These nonconductive busbar supports 206 maintain the busbars 112a-b spaced apart from the phase barrier 200 and are designed to keep the enclosure 102, busbars 112a-b, and phase barrier 200 in place and electrically isolated relative to one another when a bolt (not expressly shown) is deployed through the busbar supports 206. Similarly, a support block 208 may be attached to the phase barrier 200 at the entrance to the enclosure 102 to help support and keep that end of the phase barrier 200 spaced apart from the busbars 112a-b. The support block 208 may be a separate piece that is attached to the phase barrier 200 in some embodiments, or it may be formed as an integral part of the phase barrier 200 in some embodiments.

Figure 3A:
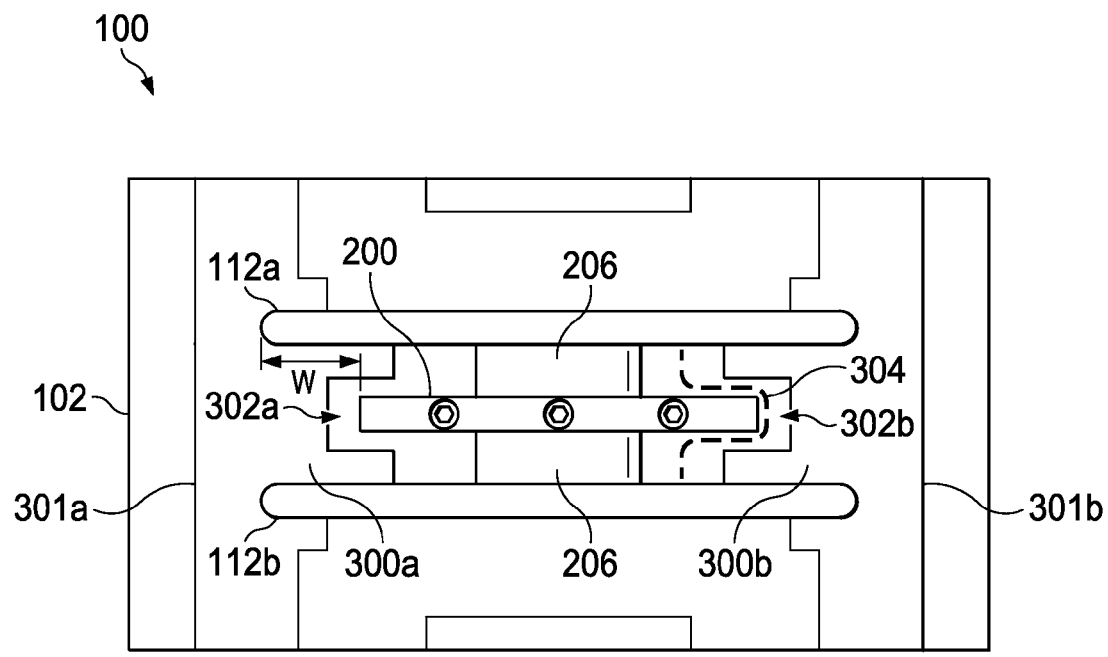
FIGS. 3A and 3B are lateral cross-sectional views of the arc interrupter according to some implementations of the disclosed embodiments.
Figure 3B:
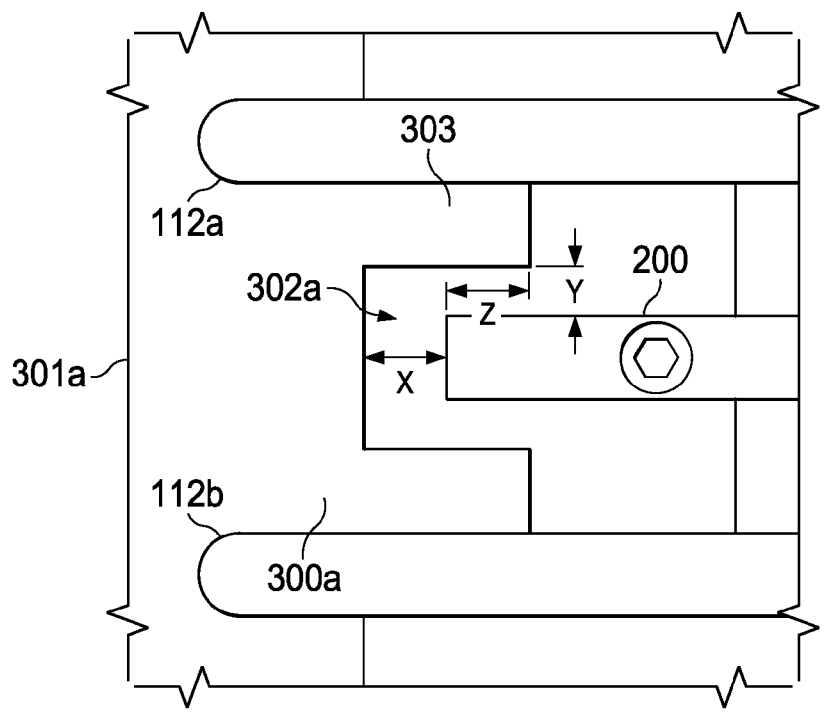

FIGS. 3A and 3B show lateral, or transverse, cross-sectional views of the arc interrupter 100. As these views show, the phase barrier 200 is spaced apart from the busbars 112a-b by the busbar supports 206 on either side of the phase barrier 200. The phase barrier 200 also has a width that is smaller than the width of the busbars 112a-b by a predefined distance "W" on either side (see FIG. 3A). Channel members 300a and 300b substantially in the shape of a "C" extend or protrude from sidewalls 301a and 301b, respectively, of the enclosure 102 toward the phase barrier 200. The channel members 300a-b bracket each side of the phase barrier 200 between the busbars 112a-b and extend along the length of the phase barrier 200. Each C-shaped channel member 300a-b faces or opens toward the phase barrier 200 and is spaced apart from the phase barrier 200 by predefined distances "X" and "Y" (see FIG. 3B). The C-shaped channel members 300a-b define C-shaped corridors 302a and 302b on each side of the phase barrier 200 along the length of the phase barrier 200. In some embodiments, each C-shaped channel member 300a-b may also have an offset portion 303 that extends over the phase barrier 200 by a predefined distance "Z" so as to block any direct line-of-sight path between the busbars 112a-b. In some embodiments, the predefined distances W, X, Y, and Z, may be about 21 mm, 5 mm, 7.15 mm, and 6.5 mm, respectively, although other measurements may certainly be used without departing from the scope of the disclosed embodiments.

The lack of a direct line-of-sight path between the busbars 112a-b in the arc interrupter 100 forces any arc 304 entering or otherwise forming in the arc interrupter 100 to conform to an arcuate or serpentine shape within the C-shaped side corridors 302a-b. The arcuate or serpentine shape creates a bend in the middle of the arc 304 that stretches and increases the voltage of the arc 304 within the arc interrupter 100. This increased voltage reduces the arc current, resulting in lower total energy generated by the arc. The arc 304 is then compelled by electromagnetic forces along one of the side corridors 302a-b toward the terminal ends of the busbar 112a-b where the arc 304 enters the arc interruption zone 106 of the arc interrupter 100, as shown in FIG. 4.

Figure 4:
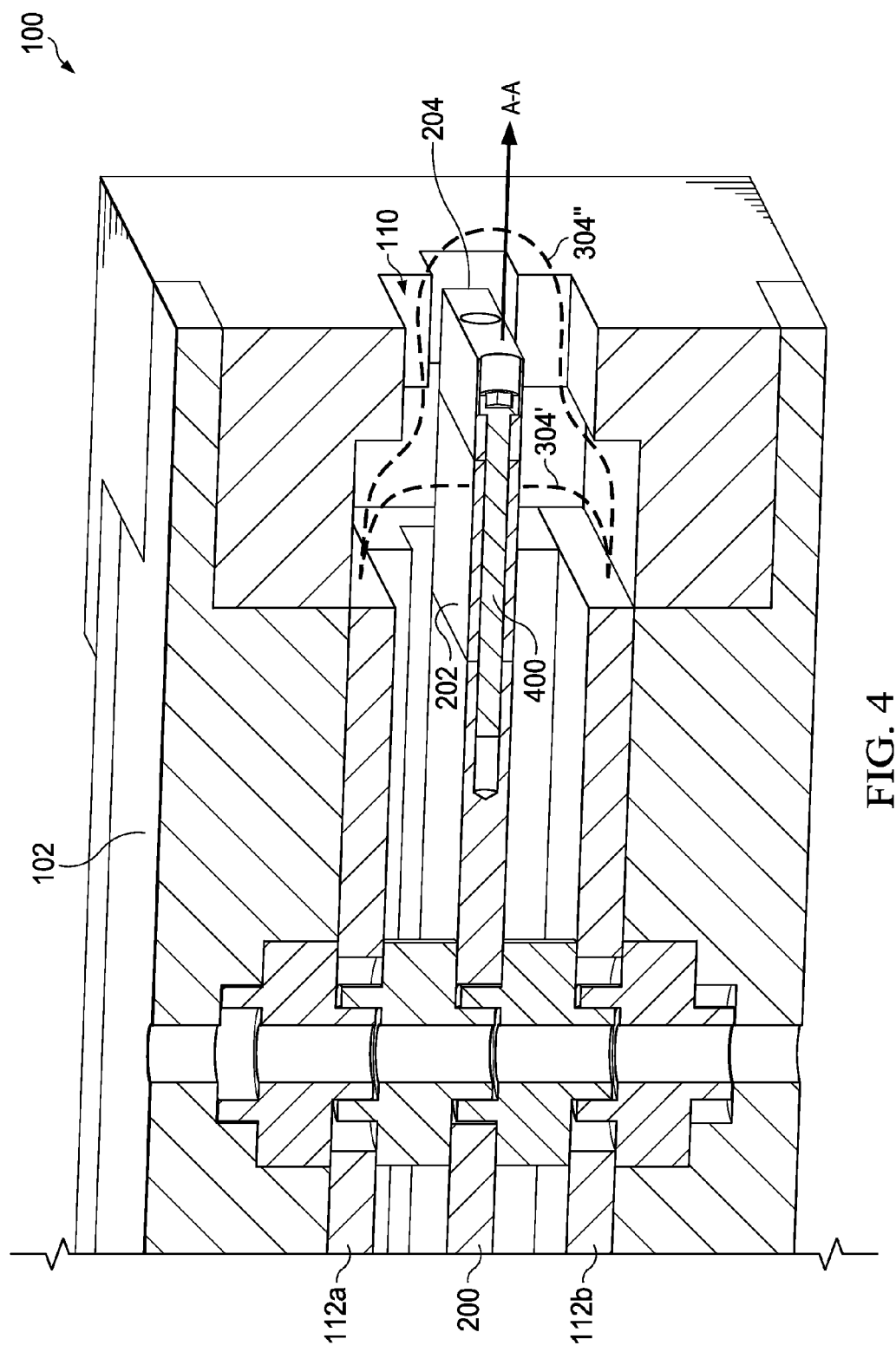
FIG. 4 is a longitudinal cross-section of an arc interruption zone of the arc interrupter according to some implementations of the disclosed embodiments.

As can be seen in FIG. 4, the arc interruption zone 106 is where the arc 304 is transitioned from the side corridors 302a-b along the sides of the arc interrupter 100 to the middle of the arc interrupter 100. During this transition, the arc 304 loses the arcuate or serpentine shape and assumes more of a bulging or distended shape as the arc is formed along or on the longitudinal axis A-A of the arc interrupter 100. In some embodiments, the transition is accomplished via the conductive arc plate 202 mentioned above attached to the end of the phase barrier 200. The conductive arc plate 202 basically provides a shorter path of least resistance between the busbars 112a-b compared to the side corridors 302a-b on the side of the arc interrupter 100 so any arc 304 in the corridors naturally moves over to the arc plate 202, as indicated at 304'. This conductive plate 202 may have about the same width and thickness as the phase barrier 200 and may extend from the phase barrier 200 up to the exhaust port 110, or about 30 mm in some embodiments.

The phase barrier 200 itself may extend past the busbars 112a-b a predefined distance (e.g., 15 mm) in some embodiments to ensure the transitioned arc 304' is conveyed beyond the busbars 112a-b. Expanding hot gasses from within the arc interrupter 100 created as a result of the initial arc 304 and aided by electromagnetic forces push the transitioned arc 304' off the conductive arc plate 202 and toward the nonconductive barrier extension 204 attached thereto in the exhaust port 110. Like the arc plate 202, the nonconductive barrier extension 204 may have about the same width and thickness as the phase barrier 200, and may extend a length of about 15 mm in some embodiments. Because the barrier extension 204 is not conductive, the transitioned arc 304' is forced to form, reform, or otherwise extend beyond the barrier extension 204, as indicated at 304". In doing so, the extended arc 304" stretches so far beyond the busbars 112a-b that it can no longer be sustained and is extinguished and disperses. Any arc gases and other arc byproducts are thereafter expelled through the exhaust port 110.

In some embodiments, a bolt or screw 400 or other fastening mechanism may be used to fasten the barrier extension 204 and the arc plate 202 to the phase barrier 200. As well, in some embodiments, an energy absorbing filter may be disposed in the exhaust port 110 to cool the arc gases and byproducts to a temperature where they are no longer conductive and can no longer reignite (e.g., 2,000° F.), as described in U.S. application Ser. No. 14/585,518 entitled "Method for Treating Internal Arcs" referenced above.

Figure 5A:
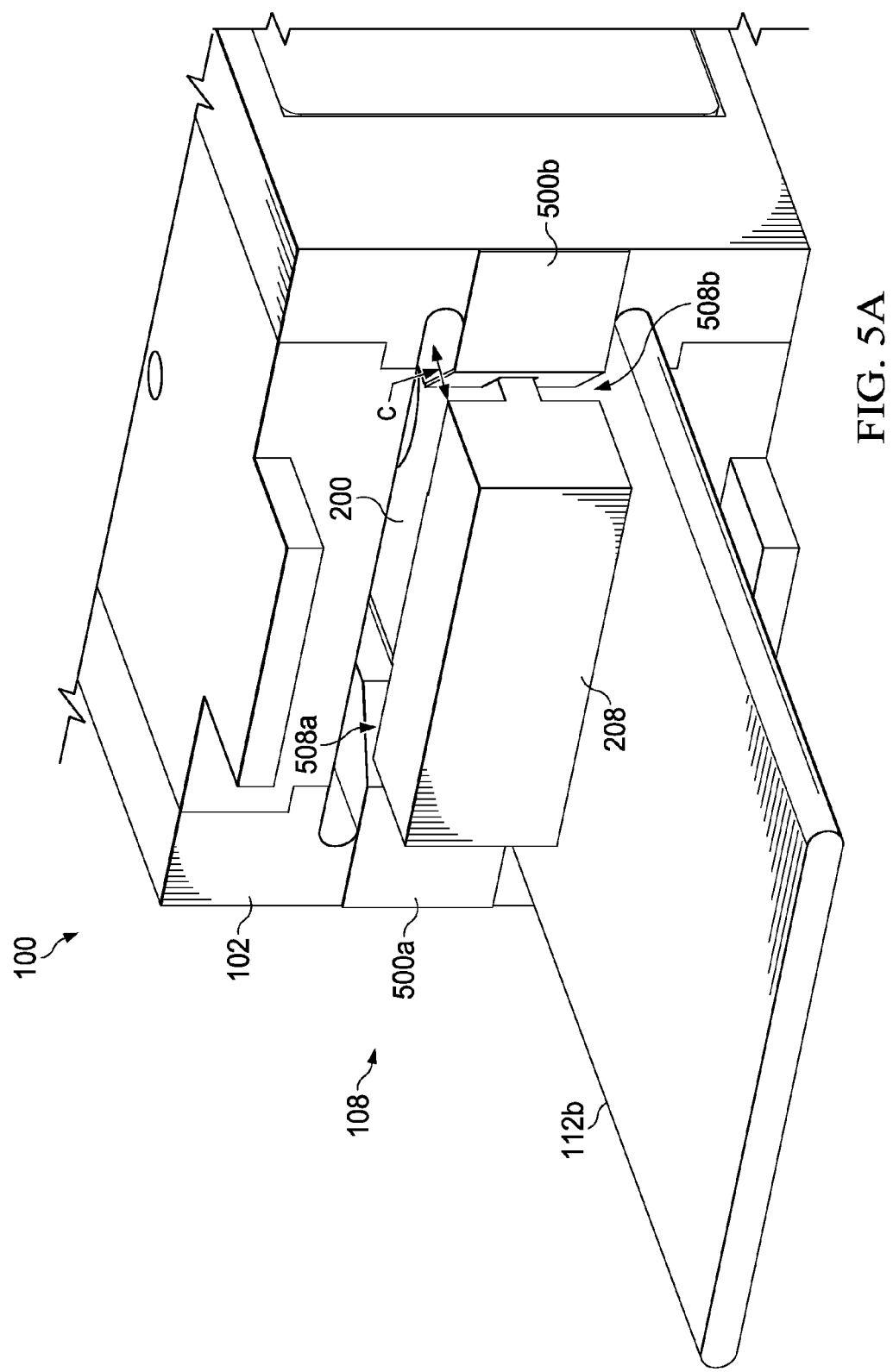
FIGS. 5A and 5B are perspective views of a backflow valve according to some implementations of the disclosed embodiments.
Figure 5B:
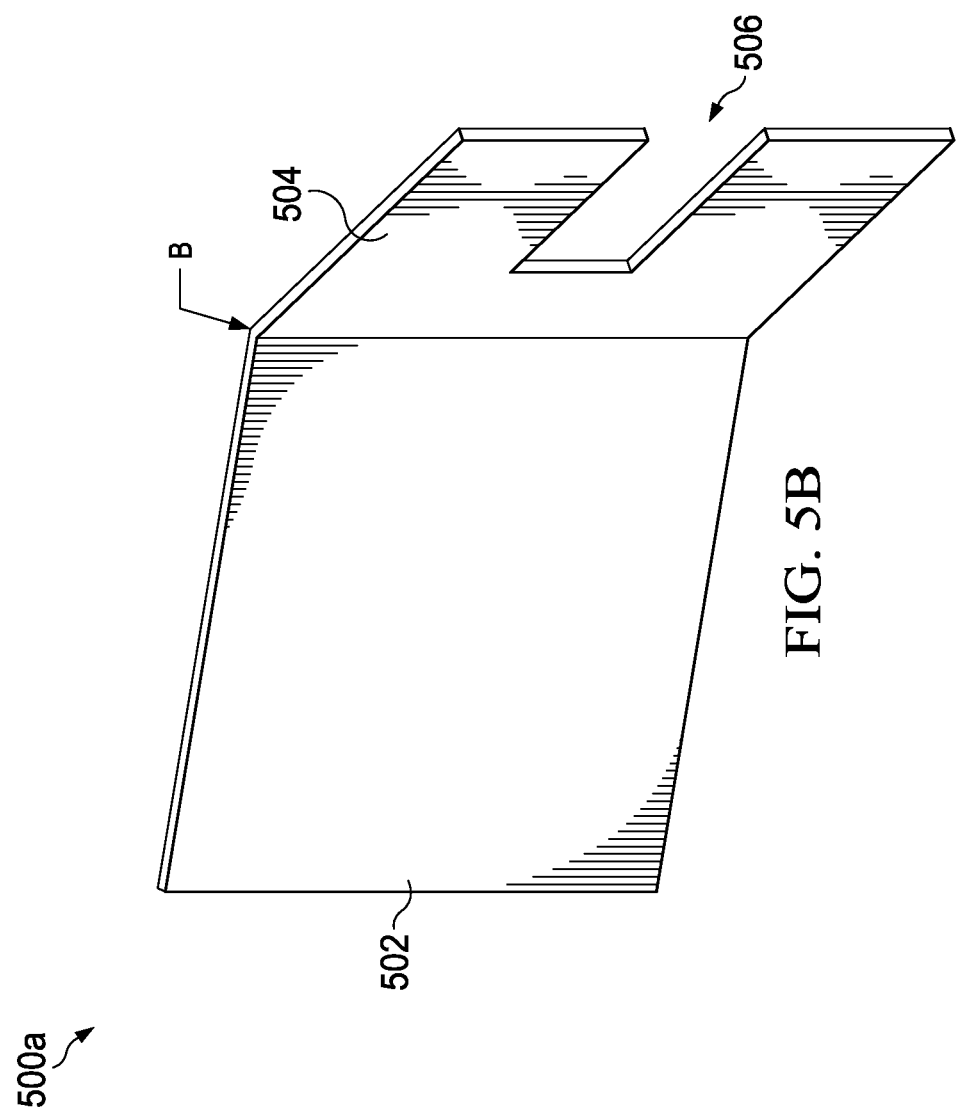

In some embodiments, valves may be provided at the entrance of the arc interrupter to prevent any arc gases and other arc byproducts within the arc interrupter 100 from escaping back through the entrance 108. This is depicted in FIGS. 5A-5B, where backflow valves 500a and 500b are shown mounted to the enclosure 102 (the top busbar has been removed for viewing purposes). Any suitable unidirectional nonconductive valves may be used as the backflow valves 500a-b without departing from the scope of the disclosed embodiments. In the example shown here, each backflow valve 500a-b resembles a flexible rectangular flap bent at an angle along the line indicated at "B" to define a fixed portion 502 and a movable portion 504. The fixed portion 502 is fixedly attached to the enclosure 102 while the movable portion 504 remains free to swing as indicated by the double-headed arrow "C." A slot 506 is provided in the movable portion 504 to accommodate the phase barrier 200. When properly mounted to the enclosure 102 adjacent the support block 208 of the phase barrier 200, the angle of the movable portion 504 leaves an opening 508a and 508b on either side of the support block 208 that allows any arc gases and arc byproducts from an arc formed outside the enclosure to enter the enclosure. Conversely, any arc gases and arc byproducts already in the enclosure force the movable portion 504 automatically to close the openings 508a-b.

Figure 6A:
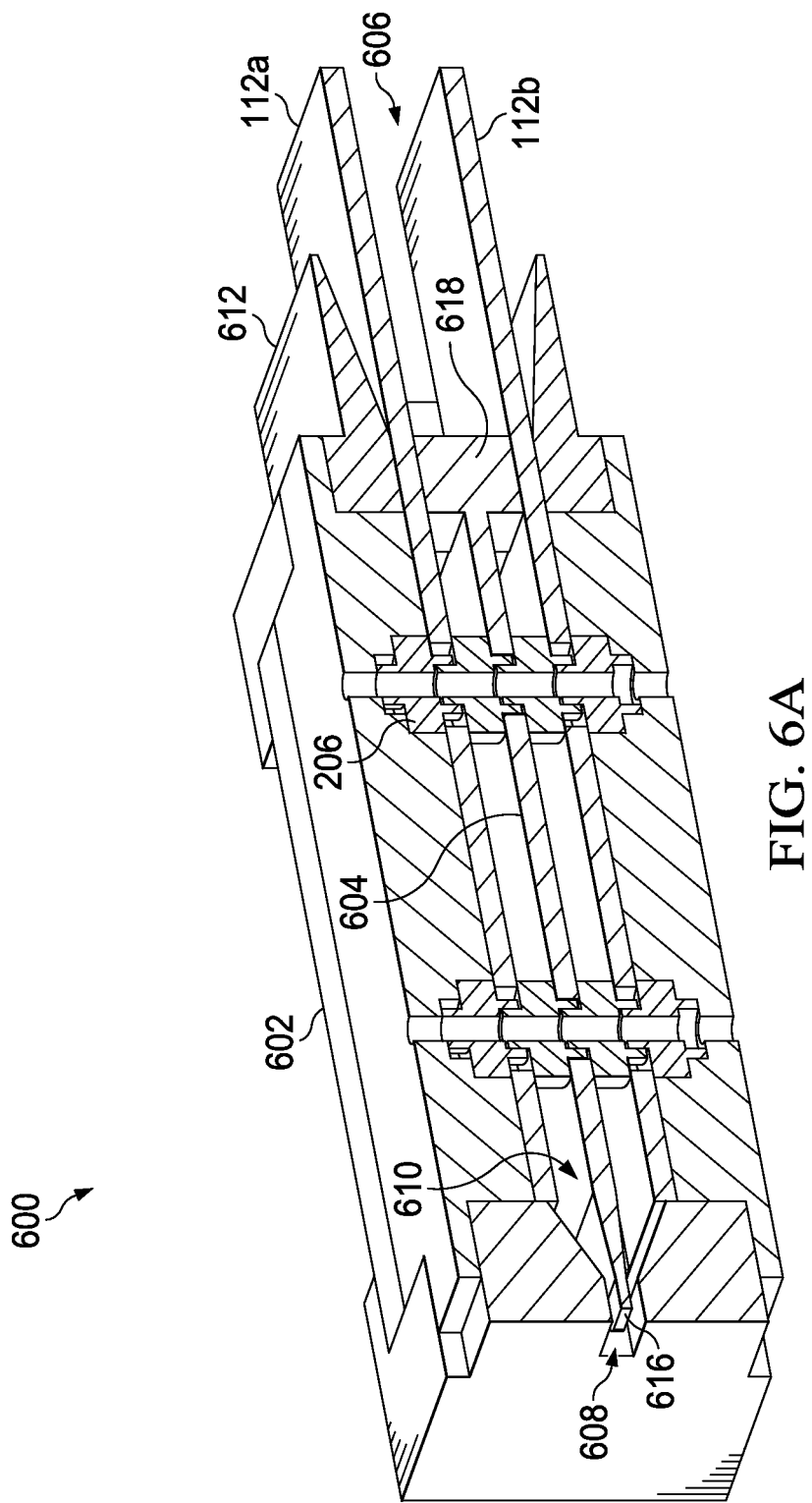

In some embodiments, instead of a conductive arc plate, the transition of the arc from the C-shaped corridors on the sides of the arc interrupter to the middle of the interrupter may be accomplished by tapering a section of the phase barrier in the arc interruption zone. An example of these embodiments is depicted in FIG. 6A, where an arc interrupter 600 is shown having an enclosure 602 mounted over the terminal ends of the busbars 112a-b. As with the previous embodiments, a phase barrier 604 extends longitudinally between the busbars 112a-b substantially parallel therewith and substantially equidistance therefrom. This section constitutes the arc transition zone and may include C-shaped side corridors (not visible here) formed by C-shaped channel members that are similar to their counterparts in FIGS. 3A and 3B extending from the sidewalls of the phase barrier 604. The phase barrier 604 again starts from near the entrance 606 of the enclosure 602, but extends past the terminal ends of the busbars 112a-b into the arc interruption zone up to the exhaust port 608. A funnel-shaped internal opening 610 may be formed in the enclosure 602 before the exhaust port 608 to funnel any arc gases and arc byproducts into the exhaust port 608. Similarly, a convergence device 612 resembling a cone may precede the entrance 606 to the enclosure 602 to help funnel any arc gases and arc byproducts into the enclosure 602. Backflow valves discussed previously (see FIGS. 5A and 5B) may also be provided at the entrance to the enclosure 602 to prevent arc gases and byproducts from escaping back through the entrance 606. Annular busbar supports 206 may again be provided to maintain the phase barrier 604 spaced apart from the busbars 112a-b.

In accordance with the disclosed embodiments, instead of a conductive arc plate, the phase barrier 604 may have a nonconductive tapered section 614 at the place where the conductive arc plate would have been and extending toward a terminal end 616 of the phase barrier. As can be seen in FIG. 6B, the tapered section 614 narrows the width, indicated by line "M," of the phase barrier 604 so the width gets progressively narrower toward the terminal end 616. In some embodiments, the tapered section 614 may also narrow the thickness, indicated by line "N," of the phase barrier 604 toward the terminal end 616 so the thickness gets progressively smaller toward the terminal end 616. The tapered section 614 provides essentially the same function as the conductive arc plate described above insofar as it helps transition any arc from the side corridors on the sides of the arc interrupter 600 toward the longitudinal axis of the arc interrupter 600. As the arc cannot form over the nonconductive tapered section 614, it must extend over the tapered section 614, becoming stretched in the process to such an extent that it can no longer be sustained. A phase barrier support block 618 may be formed as an integral part of the phase barrier 604 in the manner shown here, or the support block 618 may be provided as a separate component that may be attached to the phase barrier 604 in some embodiments.

Figure 7:
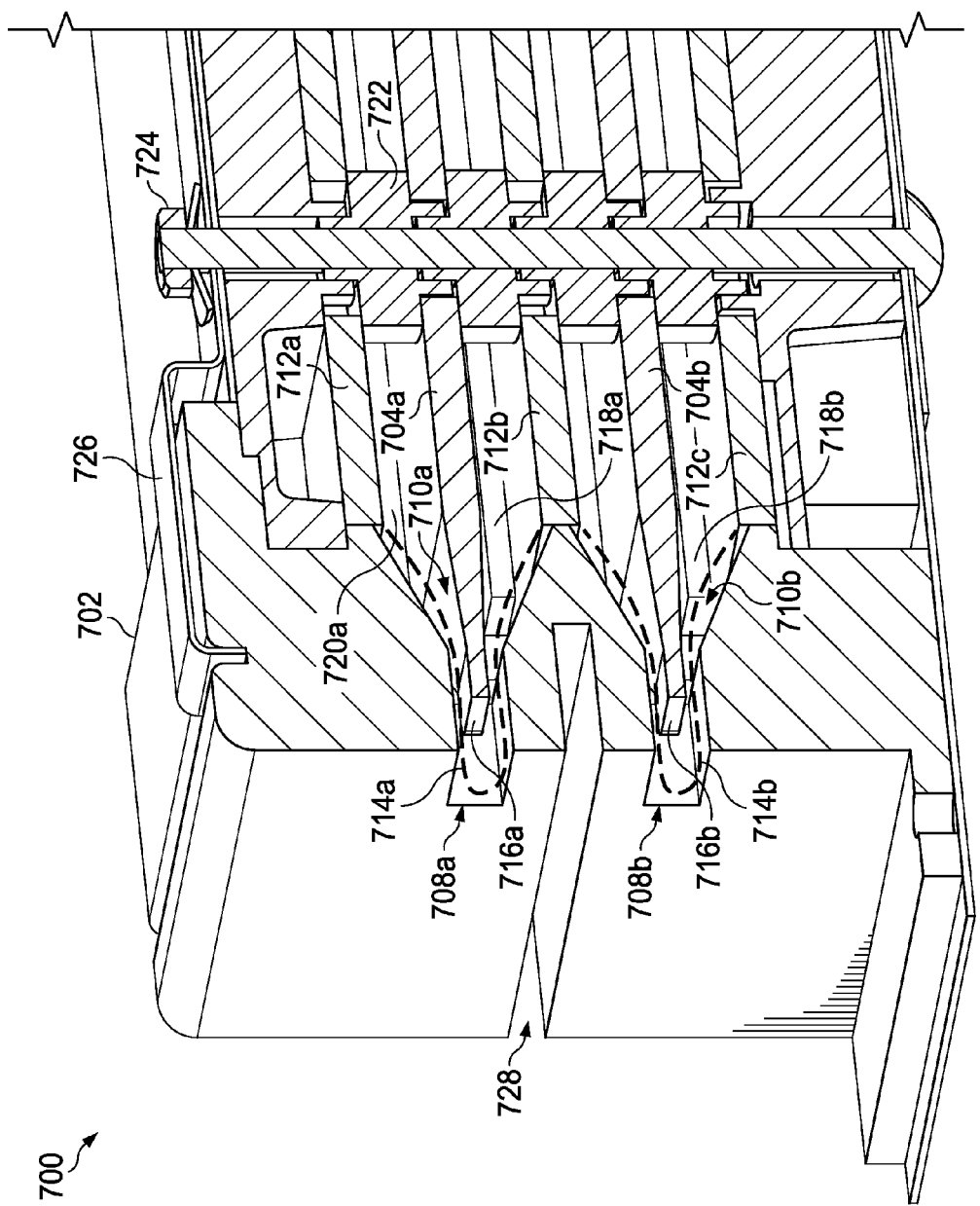
FIG. 7 is a longitudinal cross-sectional view of yet another exemplary arc interrupter according to some implementations of the disclosed embodiments.

In the foregoing embodiments, the arc interrupter has been described with respect to a single phase system for ease of understanding the inventive concepts disclosed herein. Following now in FIG. 7 is an example of an arc interrupter 700 that may be used with a multiphase system. The arc interrupter 700 is similar to the arc interrupter 600 discussed above except it has an enclosure 702 that can accommodate the terminal ends of multiple busbars, 712a, 712b, and 712c in this example. As well, there are multiple phase barriers 704a and 704b extending in a longitudinal direction between the multiple busbars 712a-c, respectively, substantially parallel therewith and substantially equidistance therefrom. The phase barriers 704a-b in these embodiments resemble the phase barrier 604 in FIG. 6, but it is of course possible to use the phase barrier 200 (and the conductive arc plate 202) from FIG. 2 instead. Each phase barrier 704a-b extends from near the entrance of the enclosure (not visible here) to past the terminal ends of the busbars 712a-c (i.e., into the arc interruption zone) and all the way up to their respective exhaust ports 708a and 708b. As with the phase barrier 604, the phase barriers 704a-b here have tapered sections 714a and 714b that narrow the widths of the phase barriers 704a-b, and their thicknesses as well in some cases, toward the terminal ends 716a and 716b of the phase barriers 704a-b. Funnel shaped internal openings 710a and 710b may be formed in the enclosure 702 in front of each exhaust port 708a-b to funnel any arc gases and arc byproducts into the exhaust ports. The internal openings 710a-b help to funnel any arcs (see dashed lines) in the enclosure 702 over the tapered section 716a-b so the arc becomes stretched too far beyond the terminal ends of the busbars 712a-c that it can no longer be sustained and is subsequently extinguished and disperses.

Opposing C-shaped channel members 718a and 718b may be provided extending or protruding from sidewalls 720a and 720b (only sidewall 720a is visible here) on either side of each phase barrier 704a-b to define longitudinally extending C-shaped corridors along the sides of the phase barriers 704a-b. Annular busbar supports 722 may be provided to maintain the phase barriers 704a-b spaced apart from the busbars 712a-c, and a bolt 724 or other fastening mechanism may be deployed through the annular supports 722 to keep the enclosure 712, busbars 712a-c, and phase barriers 704a-b in place. The bolt 724 or other fastening mechanism may also fasten a mounting bracket 726 as well to secure the enclosure 702 to a panelboard (see FIG. 8). In some embodiments, a slit 728 may be provided on the exterior of the enclosure 702 between the exhaust ports 708a-b to increase the exterior surface area near the exhaust ports 708a-b for improved cooling of the arc gases and arc byproducts exiting the exhaust ports 708a-b.

Figure 8:
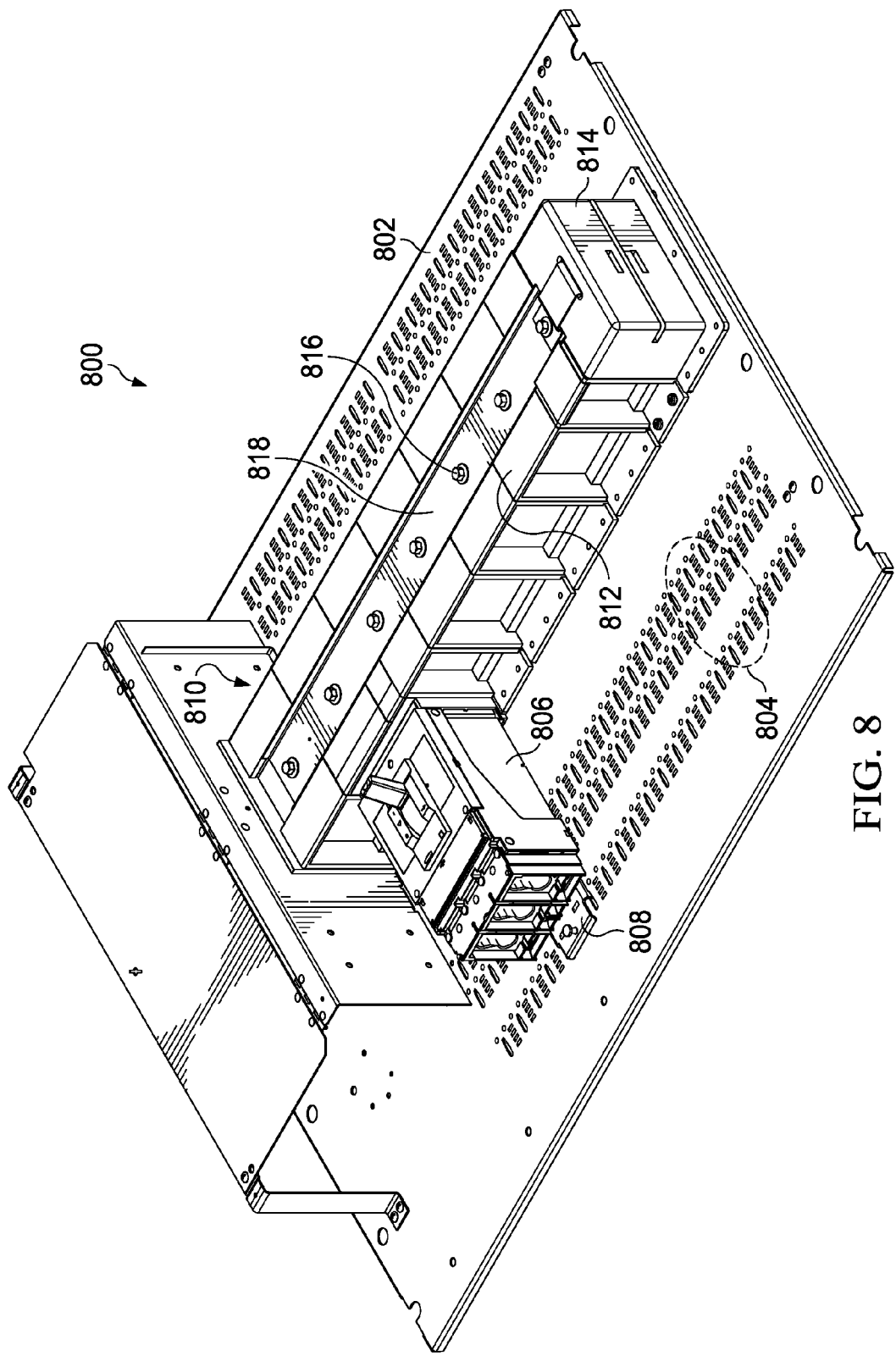
FIG. 8 shows an exemplary arc interrupter mounted at the end of an enclosed bus stack according to some implementations of the disclosed embodiments.

Thus far, examples of the arc interrupter disclosed herein have been shown and described with respect to bare busbars and bus stacks. FIG. 8 shows an example of the disclosed arc interrupter attached to an exemplary panelboard 800. The panelboard 800 shown here may resemble one of the I-Line™ series of panelboards from Schneider Electric USA, Inc., but it will be understood the inventive concepts disclosed herein are equally applicable to other types of panelboards. In the example of FIG. 8, the panelboard 800 has a mounting pan 802 having a series of mounting holes 804 formed therein. The mounting holes 804 allow one or more circuit breakers 806 to be mounted on the mounting pan 802 via mounting brackets 808 attached to the circuit breakers 806. The circuit breakers 806 form part of a housing 810 that encloses a bus stack composed of horizontally mounted, parallel, and spaced apart busbars therein. Blank fillers 812 may be used to fill in any unused circuit breaker mounting space on the panelboard 800 to maintain the integrity of the housing 810. In accordance with the disclosed embodiments, an arc interrupter 814 may then be attached to the panelboard 800 at the end of the housing 810 to extinguish and disburse any arcs that may form within the housing 810, as described above. Bolts or other fasteners 816 and a flange plate 818 may be used to secure the assembly together.

Figure 9:
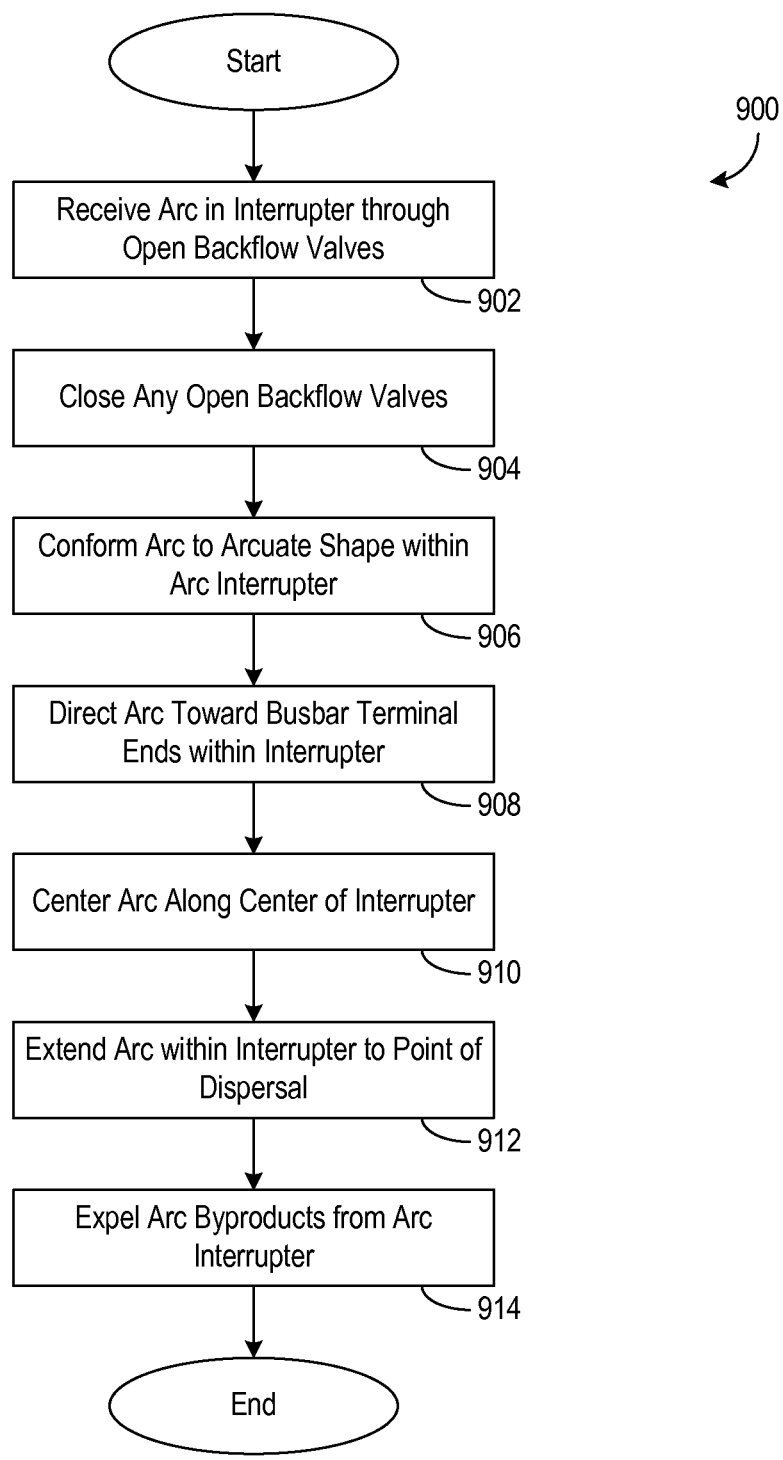
FIG. 9 is a flowchart for a method of extinguishing an arc according to some implementations of the disclosed embodiments.

Based on the foregoing description, it can be seen that the arc interrupter disclosed herein may be implemented in a number of ways without departing from the scope of the disclosed embodiments. FIG. 9 offers general guidelines in the form of a flow chart 900 that may be used with any implementation to extinguish an arc according to the disclosed embodiments.

As the flow chart 900 shows, extinguishing an arc begins with receiving the arc in an arc interrupter or otherwise allowing the arc to form between two busbars in the arc interrupter at block 902. Any backflow valves in the arc interrupter are initially open to allow the arc and arc byproducts to enter the arc interrupter, but once the arc is in the arc interrupter, these backflow valves are forced closed by pressure resulting from the arc, as indicated at block 904. At block 906, the arc is stretched or otherwise conformed to an arcuate or serpentine shape within a side corridor in the arc interrupter. The arc is then directed by electromagnetic forces along the side corridor toward the terminal ends of the busbar at block 908. At block 910, the arc is transitioned from the side corridor to the center of the interrupter where the arc loses the serpentine shape and assumes a bulging or distended shape. Pressure from the arc gases in the arc interrupter then push the arc beyond the terminal ends of the busbar to an extent that it can no longer be sustained and subsequently disperses at block 912. At block 914, the arc gases and arc byproducts from the art are expelled from the arc interrupter.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. An arc interruption device for electrical distribution equipment, comprising:
   an enclosure having an arc transit zone and an arc interruption zone, the arc transit zone including an entrance to the enclosure and the arc interruption zone including an exhaust port from the enclosure;
   an insulated phase barrier disposed within the arc transit zone and extending longitudinally along the enclosure into the arc interruption zone, the enclosure having sidewalls that form a side corridor with the phase barrier on each side of the phase barrier; and
   an arc extender attached to the insulated phase barrier and extending longitudinally along the enclosure in the arc interruption zone, the arc extender configured to transition an arc away from the side corridor and toward a center of the enclosure.

2. The arc interruption device of claim 1, wherein the arc extender comprises a conductive arc plate attached to the insulated phase barrier and extending longitudinally along the enclosure in the arc interruption zone.

3. The arc interruption device of claim 2, wherein the arc extender further comprises a barrier extension attached to the conductive arc plate and extending longitudinally along the enclosure in the interruption zone.

4. The arc interruption device of claim 1, wherein the arc extender comprises a tapered section on the insulated phase barrier extending longitudinally along the enclosure in the arc interruption zone, the tapered section having a progressively narrower width as the tapered section extends in a direction away from the phase barrier.

5. The arc interruption device of claim 1, further comprising a substantially C-shaped channel member protruding from each sidewall of the enclosure and extending longitudinally along the enclosure adjacent the phase barrier, the C-shaped channel member providing a substantially C shape for the side corridor on each side of the phase barrier.

6. The arc interruption device of claim 1, further comprising a convergence device disposed at the entrance of the enclosure and configured to facilitate entrance of arc byproducts into the enclosure.

7. The arc interruption device of claim 1, further comprising backflow valves disposed near the entrance of the enclosure and operable to prevent arc byproducts in the enclosure from escaping backward through the entrance of the enclosure.

8. The arc interruption device of claim 7, further comprising an exhaust port disposed in the arc interrupter along a center of the arc interrupter, the exhaust port configured to expel arc byproducts from the arc interrupter.

9. The arc interruption device of claim 7, further comprising a convergence device disposed at an entrance of the arc interrupter and configured to facilitate entrance of the arc and arc byproducts into the arc interrupter.

10. The arc interruption device of claim 1, further comprising a plurality of busbars spaced apart substantially parallel to one another, and the insulated phase barrier being disposed within the arc transit zone parallel to the busbars and extending longitudinally along the arc transit zone into the arc interruption zone.

11. The arc interruption device of claim 10, further comprising a substantially C-shaped channel member protruding from a sidewall of the arc interrupter and extending longitudinally along the arc transit zone, the C-shaped channel member defining a C-shaped side corridor with the phase barrier extending longitudinally along the arc transit zone.

12. The arc interruption device of claim 10, further comprising a conductive arc plate attached to the insulated phase barrier and extending longitudinally along the arc interruption zone.

13. The arc interruption device of claim 12, further comprising a barrier extension attached to the conductive arc plate and extending longitudinally along the arc interruption zone.

14. The arc interruption device of claim 10, further comprising a tapered section extending from the insulated phase barrier longitudinally along the arc interruption zone, the tapered section having a progressively narrower width as the tapered section extends in a direction away from the phase barrier.

15. A method of extinguishing arcs occurring between busbars, comprising:
    receiving an arc in an arc interrupter, the arc occurring between at least two busbars, each busbar spaced apart substantially parallel to one another, each busbar having a terminal end extending away from a current source, the arc interrupter mounted over the terminal ends of the busbars;
    conforming the arc to an arcuate shape within at least one side corridor of the arc interrupter;
    moving the arc within the at least one side corridor toward the terminal ends of the busbars;
    centering the arc along a longitudinal axis of the arc interrupter at the terminal ends of the busbars, the centering causing the arc to change from the arcuate shape to a distended shape; and
    extending the arc beyond the terminal ends of the busbars such that the arc is extinguished.

16. The method according to claim 15, wherein moving the arc comprises guiding the arc along a phase barrier extending along a length of the arc interrupter.

17. The method according to claim 16, wherein centering the arc comprises transitioning the arc over a conductive arc plate attached to the phase barrier along the center of the arc interrupter.

18. The method according to claim 16, wherein centering the arc comprises transitioning the arc around a tapered section extending from the phase barrier along a longitudinal axis of the arc interrupter.

* * * * *